No. 634,958. Patented Oct. 17, 1899.
M. H. RAY & W. H. PAINE.
APPARATUS FOR INFLATING BICYCLE TIRES.
(Application filed Mar. 10, 1898.)

(No Model.) 4 Sheets—Sheet 1.

WITNESSES.
Charles T. Hannigan.
A. E. Perce.

INVENTORS.
Miles H. Ray
William Howard Paine
Warren R. Perce
Atty.

THE NORRIS PETERS CO., PHOTO-LITHO., WASHINGTON, D. C.

No. 634,958. Patented Oct. 17, 1899.
M. H. RAY & W. H. PAINE.
APPARATUS FOR INFLATING BICYCLE TIRES.
(Application filed Mar. 10, 1898.)

(No Model.) 4 Sheets—Sheet 2.

WITNESSES.
Charles T. Hannigan.
A. E. Perce.

INVENTORS.
Miles H. Ray
William Howard Paine
By Warren R. Perce
Atty.

THE NORRIS PETERS CO., PHOTO-LITHO., WASHINGTON, D. C.

No. 634,958. Patented Oct. 17, 1899.
M. H. RAY & W. H. PAINE.
APPARATUS FOR INFLATING BICYCLE TIRES.
(Application filed Mar. 10, 1898.)
(No Model.) 4 Sheets—Sheet 3.
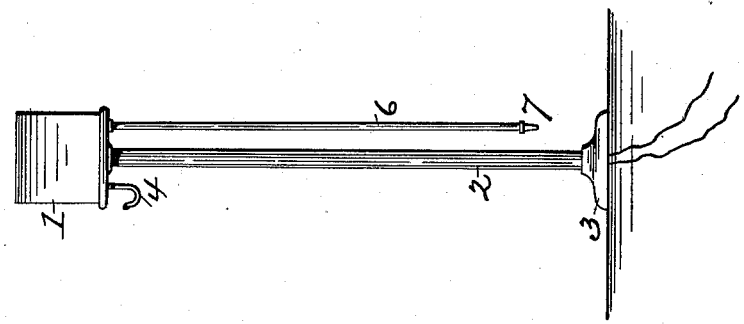
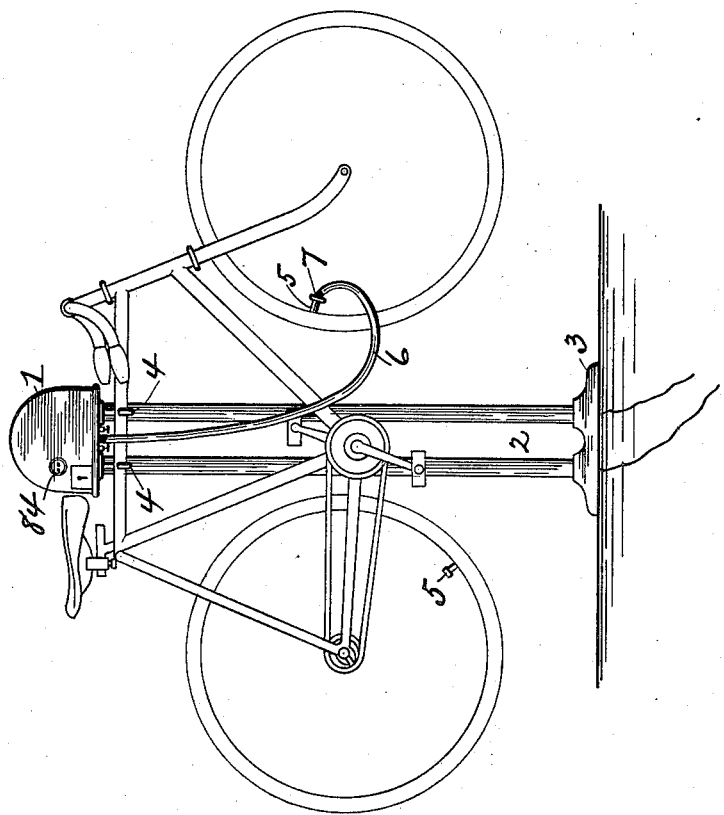

No. 634,958. Patented Oct. 17, 1899.
M. H. RAY & W. H. PAINE.
APPARATUS FOR INFLATING BICYCLE TIRES.
(Application filed Mar. 10, 1898.)
(No Model.) 4 Sheets—Sheet 4.
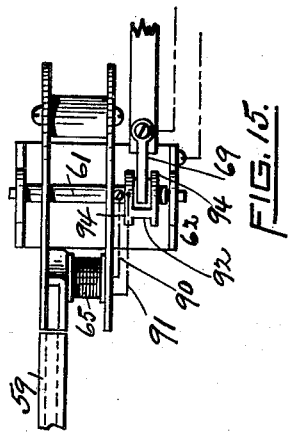
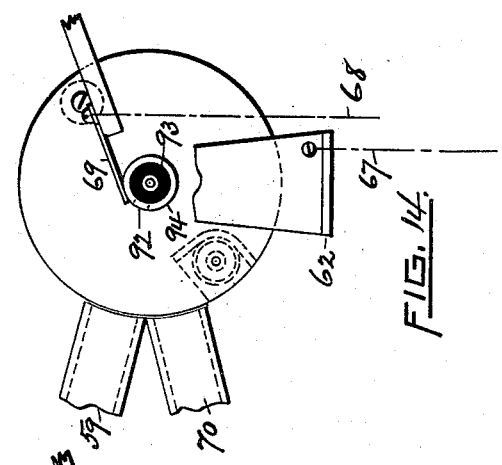
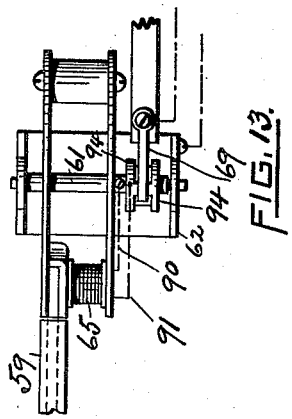
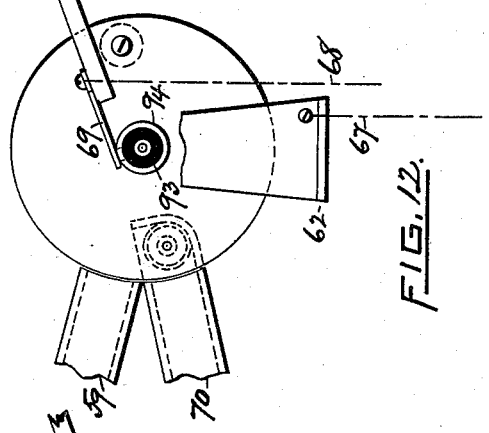
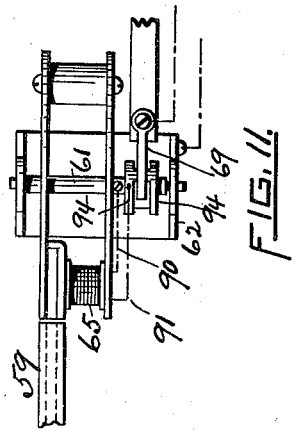
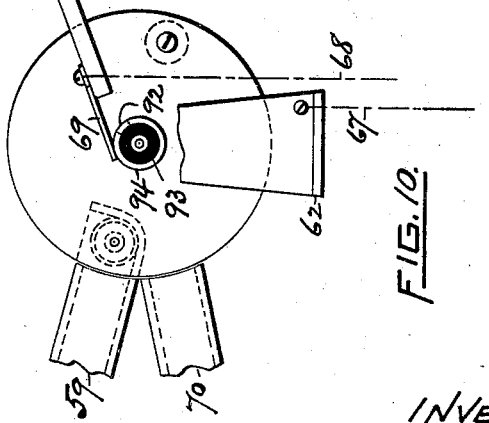

UNITED STATES PATENT OFFICE.

MILES H. RAY, OF EAST PROVIDENCE, AND WILLIAM HOWARD PAINE, OF PROVIDENCE, RHODE ISLAND.

APPARATUS FOR INFLATING BICYCLE-TIRES.

SPECIFICATION forming part of Letters Patent No. 634,958, dated October 17, 1899.

Application filed March 10, 1898. Serial No. 673,392. (No model.)

*To all whom it may concern:*

Be it known that we, MILES H. RAY, of East Providence, and WILLIAM HOWARD PAINE, of the city of Providence, in the county of Providence, in the State of Rhode Island, have invented a certain new and useful Improvement in Coin-Controlled Apparatus for the Inflation of Bicycle-Tires; and I declare the following to be a specification thereof, reference being had to the accompanying drawings.

Like numerals indicate like parts.

Figures 1, 2, 3:
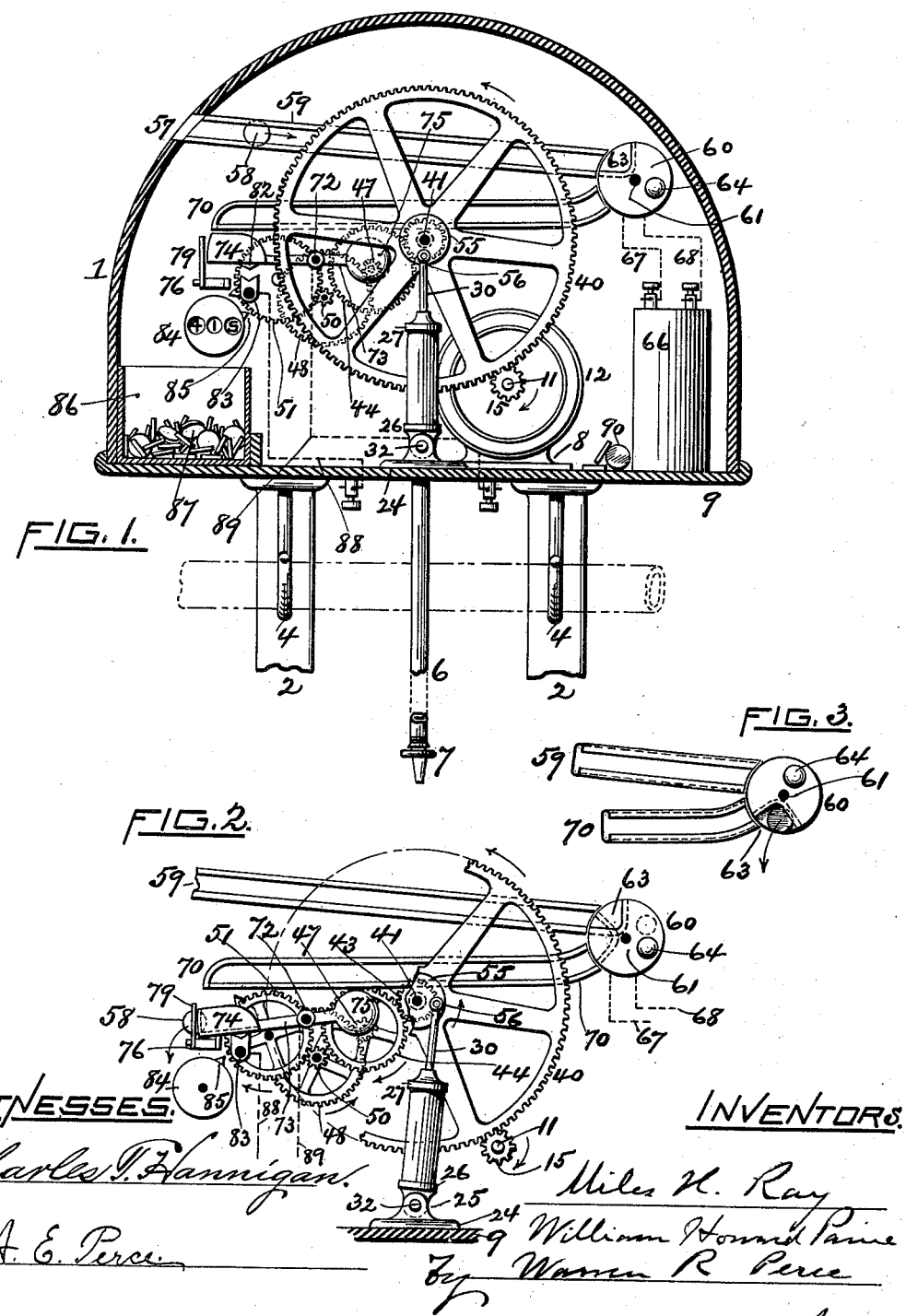
Figure 4:
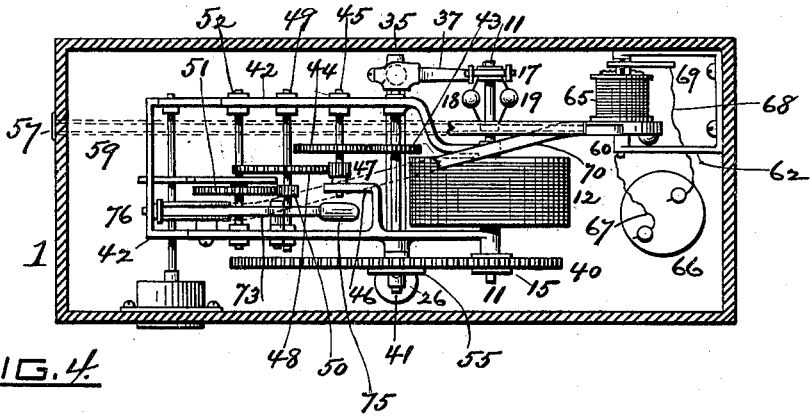
Figures 5, 6:
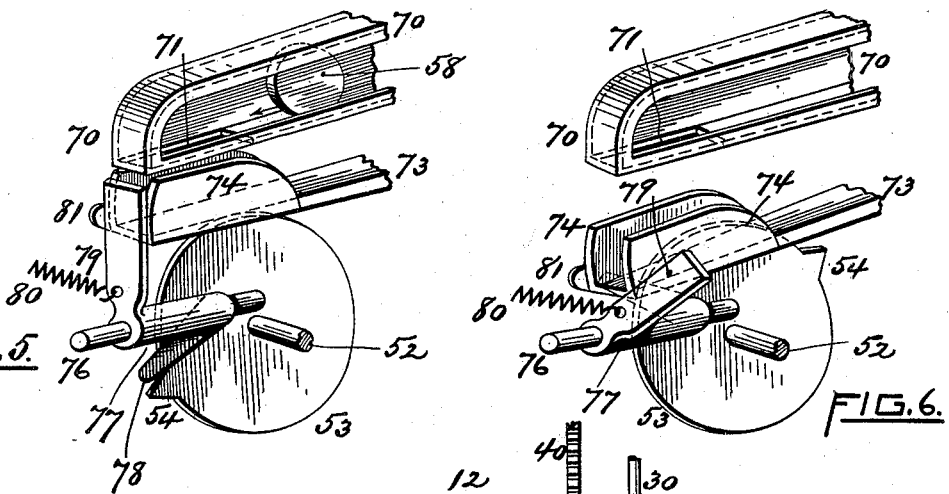
Figure 7:
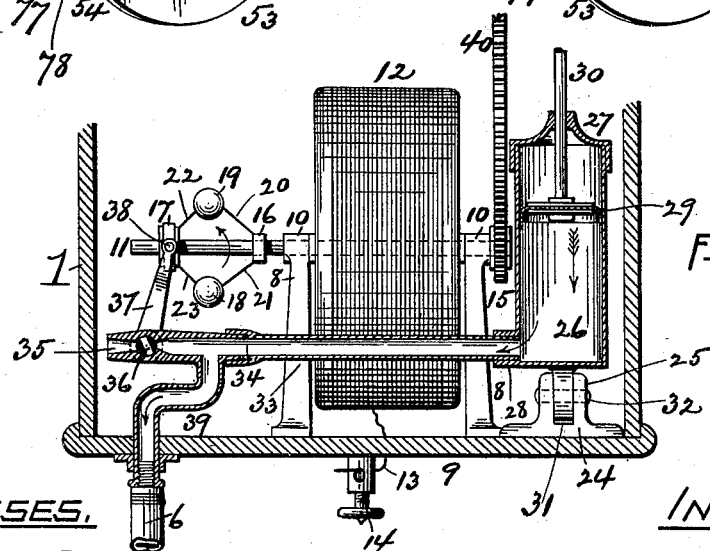

Figure 1 is a front elevation of our invention with the case thereof in vertical section. In this figure the parts are shown in their normal position when the coin has been introduced into the coin-chute, but before it has set the mechanism in operation. Fig. 2 is a view in front elevation showing the coin-chutes, coin-carrier, pump, gears, contact-lever, and registering device when the mechanism is at the instant of starting its operation. Fig. 3 is a front elevation of the coin-chutes and coin-carrier when the latter is in position to drop a metallic disk (not a coin) to prevent the operation of the machine. Fig. 4 is a top elevation of our invention with the case in horizontal section. Fig. 5 is a perspective view of the coin, lower coin-chute, contact-lever, rock-shaft, and gate and disk to operate the latter, the parts being shown in position just before the coin leaves the lower chute. Fig. 6 is a perspective view of the same parts as in Fig. 4, except the coin, and illustrates the position of the same just after the coin has been dropped from the contact-lever. Fig. 7 shows the electric motor with its bearings and connected gear and the governor on the shaft thereof in side elevation and the pump and connected pipes in central vertical section. Fig. 8 is a front elevation of our improved apparatus with a bicycle thereon in position for the inflation of the tire. Fig. 9 is a side elevation of our apparatus. Fig. 10 is a side elevation of the commutator and connected parts with the coin-carrier in position to receive the coin from the upper coin-chute. Fig. 11 is a top plan of the same when in the position shown in Fig. 10. Fig. 12 is a side elevation of the elements shown in Fig. 10 when the coin-carrier is in position to discharge the coin into the lower coin-chute. Fig. 13 is a top plan of the same when in the position shown in Fig. 12. Fig. 14 is a side elevation of the elements shown in Fig. 10 when the coin-carrier has received a spurious coin or disk and is about to discharge the same below the lower coin-chute. Fig. 15 is a top plan of the same when in the position shown in Fig. 14.

Our invention is a coin-controlled apparatus for the inflation of bicycle-tires; and it consists of the novel construction and combination of the several parts or elements, as hereinafter described, and specifically set out in the claims.

The operative mechanism is inclosed in a case 1, supported upon the standards 2 on a base 3. On the standards 2 are hooks 4, upon which a bicycle is suspended, as shown in Fig. 8. The valve-stem of the pneumatic tire of the bicycle is seen at 5. A rubber tube 6, having a connection 7, is secured to the valve 5 of the pneumatic tire and conducts the air from an air-pump, as hereinafter described.

Upon supports 8, fastened to the bottom 9 of the case 1, is mounted in suitable bearings 10 the shaft 11 of a suitable electric motor 12, Figs. 4 and 7, the wire 13 of which, Fig. 7, is in contact by means of the screw 14 with a wire from a source of electricity. The shaft 11 has a small gear 15 secured thereon at one end, and on the opposite end is a governing device which consists of a fixed collar 16 on said shaft, a loose or sliding collar 17, movable on said shaft, and two governors or balls 18 19, with metallic rods 20 21 from the collar 16 to the governor-balls 18 19, respectively, and with metallic rods 22 23 from the sliding collar 17 to the governor-balls 18 19, respectively.

A base-plate 24 upon the bottom 9 of the case 1 has the earpieces 25 and an air-pump consisting of a cylinder 26, a cylinder-head 27, and a discharge pipe or tube 28, in which cylinder is a piston 29, movable by a piston-rod 30. Said pump is mounted by an ear 31 upon a pin 32, which passes through the ears 25 25 31, so that the air-pump has an oscillating movement when in operation. A pipe 33 is fitted in the discharge-tube 28 of the air-pump at one end and at its opposite end is enlarged, as at 34, to receive the end of the pipe 35. The pipe 35 has its outer end open and is constructed, as shown in section in Fig. 7, with a valve 36 rotatably mounted therein having a transverse bore or way capable of being continuous with the bore of the pipe 35 when said valve is properly turned, or said pipe 35 may be closed by said valve 36, as in Fig. 7, when turned as there shown. A link-bar 37, fastened to said valve 36 at its lower end, has its upper end pivotally connected, as seen at 38, to the sliding collar 17. The pipe 35 has a branch pipe 39 therefrom, to which the rubber tube 6 is coupled.

The gear 15 of the motor 12 meshes with the gear 40, which is mounted upon a shaft 41, that is supported upon the frame 42, Fig. 4. A small gear 43 is fastened upon the shaft 41 and meshes with the gear 44, which is fastened upon the shaft 45, the latter being mounted in the frame 42 and in a bracket 46 thereof, as seen in Fig. 4. The shaft 45 also has a small gear 47, which meshes with the gear 48 on the shaft 49, which is mounted in the frame 42. The shaft 49 also has the small gear 50, which meshes with the gear 51 upon the shaft 52. The shaft 52 also has the circular disk 53 fastened thereon, Figs. 5 and 6, from the edge of which projects the stud or spur 54. The several gears aforesaid revolve in the direction indicated by the respective arrows shown as adjacent thereto in Figs. 1 and 2, and said gears are preferably made in such relation to each other that while the gear 15 makes two thousand revolutions the gear 40 makes two hundred revolutions and the gear 51 will make one complete revolution. On the shaft 41 is also a crank-wheel 55, to which is pivotally connected at 56 the piston-rod 30 of the air-pump.

The case 1 has a slot 57 for the insertion of the coin 58, which when inserted and released rolls by gravity down along a gently-inclined chute 59, which has a side, a top and bottom, and two flanges, as shown in the drawings.

A coin carrier or wheel 60 is mounted rotatably with a shaft 61, which is supported by the brackets 62 from the case, as shown in Fig. 4. This coin carrier or wheel has a pocket 63 on one side thereof, extending from the periphery toward the center, and radially opposite is a counterweight 64. The coin-carrying wheel 60 has a hub integral therewith and extending at one side, surrounded by a coil of wire, as seen at 65 in Fig. 4. A storage battery 66 has its wires 67 68 connected, the former with the bearing of the shaft 61 of the coin-carrying wheel 60 and the latter with the brush 69, and through the action of the brush and a commutator the wheel 60 and its hub are intermittently magnetized and demagnetized, as fully shown in Figs. 10, 11, 12, 13, 14, and 15. In said figures the coin-carrier is shown in three positions. In the first position, Figs. 10 and 11, the carrier is shown ready to receive the coin from the coin-chute 59. In this position the electric current, through the wires 67 68, the brush 69, axle 61, wires 90 and 91, and the coil 92, is interrupted by the commutator, as shown, and the magnet is inoperative. In Figs. 12 and 13 the carrier is shown in the position necessary to discharge the coin into the coin-chute 70. It will be seen that in this position the current passes by the wire 68 and brush 69 through the brass strip 92 on the commutator, through the wire 91, the electromagnet 65, the wire 90 to the axle 61, and thence through the bearing 62 and wire 67 back to the battery 66, so completing the circuit and energizing the electromagnet 65. In Figs. 14 and 15 the carrier 60 is shown in its third or lowest position, having passed beyond the chute 70 and being able to discharge the worthless disk outside of said chute. When the parts are in this position, the current from the battery 66, by the wire 68, brush 69, through the commutator, the wire 91, around the electromagnet 65, by the wire 90 to the axle 61, and thence through the bearing 62, and by the wire 67 to said battery, is again interrupted by the action of the commutator and the electromagnet again becomes inoperative.

The commutator consists of a hard-rubber barrel or tube 93, mounted on the shaft 61 and fixed thereon so as to revolve with it. On said rubber tube are mounted two brass rings 94, between which is the brass strip 92. It will be readily seen that if connection be made between the brass rings 94 and a pole of the electromagnet 65 a current will pass through the brush 69 and said brass strip 92 and brass rings 94 to the magnet, as above described, when said strip 92 by the rotation of the commutator is in metallic contact with the brush 69, and that when said brass strip 92 by said action of the commutator has passed beyond metallic contact with the brush 69 no magnetic action can take place.

In Fig. 4 the coin-chute 59 is shown partly by dotted lines and partly in solid lines. Another coin-chute 70 extends diagonally and with a gentle decline from the coin-carrying wheel 60, as shown in elevation in Figs. 1 and 2 and in top plan, partly in dotted lines and partly in solid lines, in Fig. 4. The outer end of the coin-chute 70 is closed and in the bottom of it near the end is a slot or aperture 71. (Plainly seen in Figs. 5 and 6.)

Upon a shaft 72, mounted in the frame 42, is supported a lever 73, which we designate as a "contact-lever." On its outer end are two parallel side pieces 74, projecting upward, and at its inner end is a counter poise or weight 75. A short shaft 76 is mounted on the frame 42, Fig. 4, and a sleeve 77, movable thereon, has two arms, one (indicated at 78) being a push-bar and the other (shown at 79) constituting a partially-rotating gate normally held in the vertical position (seen in Fig. 5) by means of a spiral spring 80 against a stop 81 on the end of the lever 73. The contact-lever 73 has the contact-point 82. A contact-piece 83 is mounted in the frame 42 and has a notch adapted to receive the contact-point 82 of the lever 73.

A register 84 has the usual dials, as illustrated in Fig. 1, and also a projection or stud 85, adapted to operate the gearing within, which is of the usual construction and arrangement. A box or receptacle 86 is provided within the case 1 to receive and hold the coins 87. A wire 88 from a source of electricity extends to the contact-piece 83. A wire 89 connects the electric motor 12 and the lever 73. The dials of the register 84 show through an aperture in the case 1 for that purpose, and a door in the box 86 and through the case, Fig. 8, enables the withdrawal by the owner of the apparatus of the accumulated coins 87.

Having thus explained the different parts of said mechanism, we will now explain its operation.

The bicycle whose pneumatic tires are to be inflated is hung upon the hooks 4 of the standards 2 and the rubber tube 6 is connected by its tip 7 with the valve-stem 5 of the pneumatic tire. The coin 58 is inserted in the slot 57 of the case 1 and rolls by gravity along the inclined coin-chute 59 and enters the pocket 63 of the coin-carrying wheel 60. The weight of the coin 58 in said pocket 63 overcomes the weight of the counterpoise 64 and causes the wheel 60 to rotate sufficiently to bring its pocket 63 into coincidence with the upwardly-bent inner end of the coin-chute 70, as indicated by dotted lines in Fig. 2. The coin 58 then rolls down the inclined chute 70 until it comes to the slot 71 therein, Fig. 5, and through said slot 71 it drops upon the lever 73, between the parallel side pieces 74 thereof, thereby overcoming the weight of the counterpoise 75 and causing the lever 73 to move from the position shown in Figs. 1 and 5 to the position shown in Figs. 2 and 6. The contact-point 82 of the lever 73 is by this movement brought into the notch of the contact-piece 83, thus closing the electric circuit. This circuit is formed by the wire 13, electric motor 12, wire 89, lever 73, contact-point 82, contact-piece 83, and wire 88. As soon as this electric circuit is thus closed the electric motor begins to operate and by the rotation of its gear 15 turns the gear 40. The gear 40 turns the crank-wheel 55, which is fastened to the same shaft 41 with it, and thus the piston 30 is moved in the cylinder 26 and pumps air; but as the electric motor cannot start with a load and immediately do efficient work in pumping air we provide the valve and valve-actuating mechanism shown in Fig. 7. When the motor 12 is inactive or is beginning work, the opening of the valve 36 is continuous with the bore of the pipe 35, and the air as pumped is simply blown out at the open end of the pipe 35 and does nothing toward the inflation of the tire; but when the speed and power of the electric motor accumulate, the governors 18 19 fly outwardly and move the collar 17 upon the shaft 11, thereby operating the link-bar 37 and turning the valve 36 to the position shown in Fig. 7. The air thereafter pumped is forced from the cylinder 26 through the tube 28, pipes 33, 35, and 39, and through the rubber tube 6 into the tubular tire of the bicycle-wheel to inflate the same. The coin 58 after it strikes upon the lever 73 drops therefrom, as shown in Fig. 2, and falls into the box or receptacle 86, Fig. 1. To allow the coin 58 so to drop, the gate 79 must be moved laterally from the position shown in Fig. 5 to the position shown in Fig. 6. This is caused by the disk 53, turned by the shaft 52 and gear 51, which by the gearing intermediate between it and the gear 40 is revolved, bringing the projecting spur 54 of the disk 53 against the push-bar 78 of the sleeve 77 and moving said push-bar out of its path, thus turning the sleeve and with it the gate 79 thereon. As soon as the coin 58 has been dropped by the lever 73 the spiral spring 80 returns the gate 79 to its normal position. The lever 73 being now relieved of the weight of the coin 58 is brought by its counterpoise 75 from the position shown in Figs. 2 and 6 to the position shown in Figs. 1 and 5, thereby lifting the contact-point 82 from the contact-piece 83 and breaking the electric circuit, whereupon the electric motor ceases its work. The projecting spur 54 of the disk 53 in passing has moved the projecting stud 85 of the register 84 and so has indicated on the dial that the machine has been once used. By this means the number of tires inflated by the machine is recorded.

With coin-actuated machines it is very common for evilly-disposed persons to endeavor to operate the machines by means of iron washers instead of by coins, and thus defraud the owner of the machine from the income which it is designed to earn for him. To prevent such misuse of the machine, we have provided a detective device, which is operated automatically, as follows: The storage battery 66 by its wires and commutator electrically charges the hub and wheel 60. A genuine coin, not being affected by magnetism, will not in passing be retained by the coin-carrying wheel 60, but will be shifted thereby from the coin-chute 59 to the coin-chute 70, as already described, the action of gravity causing said coin to roll out of the pocket 63 as soon as the latter is in the position indicated in Fig. 2 by dotted lines; but when the iron washer or disk rolls into the pocket 63 of the wheel 60 it is held fast therein by the magnetic force of the wheel and hub, and the wheel and hub turn by reason of the weight of the washer or disk past the opening of the coin-chute 70 and to the position shown in Fig. 3, and there as the current from the battery 66 is shut off by the commutator the washer or disk is no longer held to the wheel, but drops therefrom within the case, as indicated at 90 in Fig. 1, and the pumping mechanism is not operated at all by such washer or disk. It is evident that this protective device is equally applicable to all kinds of coin-actuated machines, as well as to that hereinbefore described.

When the coin-carrying wheel 60 is in the position shown in Fig. 1, it is inactive and the commutator is in such relation to it as to break the electric current from the battery 66; but as soon as the coin 58 has rolled into the pocket 63 of said wheel the wheel begins to turn on account of the weight of the coin, and by the turning of the wheel the commutator comes into position to complete the electric circuit, thus holding the metallic disk 58 to the wheel in the pocket thereof if the same is not genuine coin and not liberating it until the wheel and its load are in the position shown in Fig. 3.

We claim as a novel and useful invention and desire to secure by Letters Patent—

1. In a coin-controlled mechanism, the combination of two chutes in which a magnetizable disk is movable and which are arranged at an acute angle with each other and one above the other, a vertically-oscillating carrier adapted to be actuated by the weight of said disk and pivotally mounted upon proper supports and having a hub, an electric battery and wire connection therefrom with said carrier or its supports and with said hub to magnetize the same, means adapted to make and break the electric current when the carrier is in certain positions, a pocket in said carrier normally continuous with the upper chute, but opening vertically downward, when the metallic disk is therein and adapted to release the disk to the action of gravity when the electric current is broken, substantially as shown.

2. In a coin-controlled mechanism, the combination of two chutes in which a disk is movable and which are arranged at an acute angle with each other and one above the other, a vertically-oscillating carrier, adapted to be actuated by the weight of said disk and pivotally mounted upon proper supports and having a hub, an electric battery and wire connection therefrom with said carrier and its supports and with said hub to magnetize the same, means to make and break the electric current at certain positions of the carrier, a pocket in said carrier normally continuous with the upper chute and subsequently continuous with the lower chute by the oscillation of the carrier and adapted to discharge said disk into the lower chute, if said disk is of a metal not magnetizable, but which is capable of moving beyond the lower chute by the oscillation of the carrier and of releasing to the operation of gravity in a vertical direction a magnetized disk, so that the same cannot enter the lower chute but falls outside of the lower chute, whenever said pocket opens vertically downward and the electric current is broken by the means aforesaid, substantially as set forth.

3. In a coin-controlled mechanism the combination of two chutes in which a disk is movable and which are arranged at an acute angle with each other, one above the other, a vertically-oscillating magnet adapted to receive said disk from the upper chute and be actuated by the weight of said disk and pivotally mounted upon proper supports, said magnet being arranged to deliver said disk into the lower chute, if the disk is not magnetizable, but to prevent the delivery of the disk into the lower chute, if the disk is magnetizable, substantially as specified.

4. The improved coin-controlled apparatus for inflating a bicycle-tire herein described, consisting of the case 1 having a slot 57 and a bottom 9, the latter of which is mounted upon standards 2, and provided with hooks 4, an electric motor 12 having a shaft 11 mounted in bearings 10 of supports 8, a fixed collar 16 and a sliding collar 17 upon the shaft 11 near one end thereof and a gear 15 upon the opposite end thereof, two governor-balls 18, 19, the rods 23 and 22 from the sliding collar 17 to said governor-balls, respectively, the rods 20 and 21 from the fixed collar 16 to the governor-balls 19 and 18, respectively, the cogged wheel 40 mounted on a shaft 41 in a frame 42 and engageable by said gear 15, a crank-wheel 55 on said shaft 41 and also a gear 43 on said shaft, a cylinder-pump 26 mounted by its ear 31 upon a pin 32 between the ears 25 of a base 24 and having a discharge-tube 28, a piston 29 in said cylinder having a piston-rod 30 pivotally connected with the crank-wheel 55, a cylinder-head 27 upon said cylinder 26, a pipe 33 fitting in the discharge-tube 28, and having an enlarged end 34, a pipe 35 having one end open and the other end fitting into the enlargement 34 of the pipe 33, a branch pipe 39 opening from the pipe 35, a rubber tube 6 fitting on the branch pipe 39, a connection 7 on the end of the tube 6, a valve 36 in the pipe 35, a link 37 adapted to move the valve 36 and pivotally connected with the sliding collar 17, a train of gears 44, 47, 48, 50 and 51, properly mounted on shafts in the frame 42, a disk 53 on the shaft 52 of the gear 51, a spur 54 on the disk 53, a shaft 76 from the frame 42, a sleeve 77 on the shaft 76 having the push-arm 78 and the gate 79, the spiral spring 80 from the gate 79 to a fixed support, the coin-chute 59, the coin-wheel 60 upon the shaft 51, having a pocket 63 and a counterpoise 64, the coin-chute 70 having the slot 71, the contact-lever 73 on a shaft 72 and having the upwardly-extending sides 74 and the contact-point 82, the counterpoise 75 on the opposite end of the lever 73, the contact-piece 83, the register 84, with its operating-lever 85, the storage battery 66, the wire coil 65 the hub of the coin-wheel 60 and the wires 13, 67, 68, 88, 89, arranged in circuits as shown and a commutator, all operating substantially as and for the purpose specified.

MILES H. RAY.
WM. HOWARD PAINE.

Witnesses:
FRANK STEERE,
WARREN R. PERCE.